United States Patent Office.

HENRY WURTZ, OF NEW YORK, N. Y.

Letters Patent No. 73,859, dated January 28, 1868.

IMPROVEMENT IN THE MANUFACTURE OF REFINED GRAHAMITE.

The Schedule referred to in these Letters Patent and making part of the same.

TO ALL WHOM IT MAY CONCERN:

Be it known that I, HENRY WURTZ, of New York, in the county of New York, in the State of New York, have invented a new and improved article of manufacture or chemical preparation, obtained from the mineral of Ritchie county, West Virginia, called by me Grahamite; and I do hereby declare that the following is a full and exact description thereof.

Description.

The nature of my invention consists in operating upon Grahamite with certain liquid media or menstrua, which I have found to dissolve it entirely, or nearly so, thus separating it from the impurities with which it is naturally commingled, and then separating it again from the solvent by evaporation or distillation; the article thus prepared being a new resinous or resinoid product, called by me Purified or Refined Grahamite, being a superior article for the composition of varnishes, lacquers, lubricators, and many other purposes.

Some uses of refined Grahamite form the subjects of other applications for Letters Patent now in process of preparation.

The solvents which may be used in preparing refined Grahamite are many in number, but those which are most available in practice are, choloroform, bisulphide of carbon, oil of turpentine, and the different kinds of true benzole, as common coal-tar benzole, and the benzole made from Grahamite itself. One of these, oil of turpentine, requires heat in order to form a solution with rapidity, and a pressure above that of the atmosphere is also a valuable adjunct to the process. Benzoles also are assisted in their action by heat, but chloroform and bisulphide of carbon dissolve Grahamite readily in the cold. In order that these solutions may readily strain or filter clear, they should not be made too thick.

Claim.

What I claim as my invention, and desire to secure by Letters Patent, is—

The new chemical preparation or article of manufacture specified and described above, called by me Purified or Refined Grahamite, and obtained by the action of solvents upon the mineral Grahamite, substantially as above set forth.

In testimony whereof, I have hereunto attached my signature in the presence of two witnesses, in Washington, D. C., on this thirty-first day of July, 1867.

HENRY WURTZ.

Witnesses:
 JOHN F. CLARK,
 C. A. SEARS.